(12) United States Patent
Wilson et al.

(10) Patent No.: US 6,798,500 B2
(45) Date of Patent: Sep. 28, 2004

(54) METHOD FOR ESTIMATION OF CHROMATIC DISPERSION IN MULTICHANNEL OPTICAL NETWORK SPANS AND CHROMATIC DISPERSION MONITOR THEREFORE

(75) Inventors: Arthur G. Wilson, Melbourne, FL (US); Richard DeSalvo, Satellite Beach, FL (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/382,087

(22) Filed: Mar. 5, 2003

(65) Prior Publication Data

US 2003/0174311 A1 Sep. 18, 2003

Related U.S. Application Data (60) Provisional application No. 60/361,817, filed on Mar. 5, 2002.

(51) Int. Cl.[7] .............................................. G01N 21/00
(52) U.S. Cl. ...................................................... 356/73.1
(58) Field of Search .......................... 356/73.1; 398/29, 398/81, 147–159, 205; 385/27, 5; 375/316, 262, 285, 220, 260, 347

(56) References Cited

U.S. PATENT DOCUMENTS

| | | | |
|---|---|---|---|
| 5,333,147 A | 7/1994 | Nohara et al. | |
| 5,557,468 A | 9/1996 | Ip | |
| 5,774,242 A | 6/1998 | O'Sullivan et al. | |
| 6,252,692 B1 * | 6/2001 | Roberts | 398/147 |
| 6,501,874 B1 | 12/2002 | Frolov et al. | |
| 6,519,065 B1 | 2/2003 | Colbourne et al. | |
| 6,583,903 B1 * | 6/2003 | Way et al. | 398/152 |
| 6,735,259 B1 * | 5/2004 | Roberts et al. | 375/316 |
| 2002/0176070 A1 | 11/2002 | Achtenhagen et al. | |
| 2002/0176659 A1 | 11/2002 | Lei et al. | |
| 2002/0186438 A1 | 12/2002 | Morozov et al. | |

* cited by examiner

*Primary Examiner*—Tu T. Nguyen
(74) *Attorney, Agent, or Firm*—Allen, Dyer, Doppelt, Milbrath & Gilchrist, P.A.

(57) ABSTRACT

The invention relates to a method for the estimation of chromatic dispersion in multichannel optical network spans during active operation. The invention further discloses a chromatic dispersion monitor for real time monitoring of accumulated dispersion in individual channels. The method effectively estimates accumulated chromatic dispersion by obtaining a contour map of the eye diagram correlating more than three points for measuring at least two parameters to known dispersion. This can provide accurate BER indication before failure occurs and provide indication of the sign of dispersion for faster correction. A chromatic dispersion monitor includes a high speed linear receiver to receive individual channel signals from a tunable filter, a clock recovery circuit with a variable time delay device for obtaining points to establish the contoured eye map and a processor for calculating metric values from the contoured eye map and correlating the calculated metric vales to a stored library of accumulated chromatic dispersion.

9 Claims, 8 Drawing Sheets

METHOD FOR ESTIMATION OF CHROMATIC DISPERSION IN MULTICHANNEL OPTICAL NETWORK SPANS AND CHROMATIC DISPERSION MONITOR THEREFORE

CROSS-REFERENCE TO RELATED APPLICATIONS

This application claims priority from U.S. provisional application No. 60/361,817, filed Mar. 5, 2002.

TECHNICAL FIELD

The present application relates to a method and apparatus for real time passive estimation of chromatic dispersion in active wavelength division multiplexed optical network spans.

BACKGROUND OF THE INVENTION

Optical fiber systems have become widely used for high capacity telecommunications networks, where data is typically transmitted as a stream of light pulses within an optical spectrum covering some range of optical frequencies around a central frequency. Such a stream of pulses is known as a "channel". The capacity of optical fiber communications systems has been increased both by increasing the data rate for each channel, and by multiplexing channels at different wavelengths onto a single optical fiber (known in the art as wavelength division multiplexing, or WDM). Future optical fiber networks are also expected to be "agile", with the capability of adding and dropping optical channels at intermediate nodes in a network, and dynamically reconfiguring the optical paths through the network taken by each channel, with out converting optical signals to the electrical domain. These advanced networks require careful management of the distortions to optical signal pulses caused by propagation through optical fibers.

An optical pulse propagates through an optical system at a velocity known as the group velocity. The time delay for a pulse to propagate through an optical system is known as the group delay. In an optical fiber, the group velocity varies with wavelength, such that the longer wavelength components of an optical pulse propagate slightly faster or slower (depending on the sign of the chromatic dispersion) than the shorter wavelength components. This typically leads to a broadening in time of an optical pulse propagating through an optical fiber. This broadening is known as chromatic dispersion. As the pulses broaden, they eventually overlap in time, and can no longer be distinguished at an optical receiver. Chromatic dispersion is an inherent property of the optical fiber and is a function of link distance and wavelength. Thus, chromatic dispersion represents one of the fundamental limitations to the maximum data rates and transmission distances which can be achieved in an optical fiber network.

As data rates increase, such as 10 or 40 Gb/s, and channel densities increase, chromatic dispersion must be more closely managed. "Dispersion limited distance"is a metric used to describe the distance where the theoretical bit error rate (BER) reaches 1 dB. This distance is inversely proportional to the square of the data rate, or 4 times increase in data rate results in $\frac{1}{16}$ the distance without dispersion compensation.

In an all optical domain network, the residual dispersion will become dynamic and dependent on the physical path of the optical signal, requiring a dynamic dispersion compensation device. Also in multispan systems a cost effective way to track the residual dispersion from span to span is needed, as this residual dispersion is not constant across the assembly of optical carriers. Either case requires a way to monitor the residual dispersion profile for trends or changes which indicate the potential for a future outage before a failure occurs.

Known dispersion compensators, typically lengths of fiber which possess a high dispersion slope with the opposite sign to the fiber network, or tunable dispersion compensators based on Bragg gratings or etalons, are set up on a span basis at commissioning using specialized test equipment. Currently there is no way to monitor the residual chromatic dispersion in real time during operation.

Examples of etalon based dispersion compensators are disclosed in U.S. Pat. Nos. 5,557,468; and 6,519,065 and U.S. publication No. 2002/0176659, all commonly owned by the present assignee. Additional tunable dispersion compensators are disclosed in U.S. Pat. No. 6,501,874 to a tunable Bragg grating dispersion compensator, for example, and U.S. publication No. 2002/0186438.

Eye diagrams have been observed in many data transmission systems as indicative of system problems or increasing error rates. U.S. Pat. No. 5,333,147 discloses the use of an automated monitoring system to monitor error rates in eye diagrams as indications of stress or other problems in a RF transmission system. A pseudo-error region within the ideal eye diagram is designated, and incursions into this region are counted in order to give indication of eye closing, before actual failure occurs.

U.S. Pat. No. 5,774,242 discloses a system for measuring distortion in optical transmission using an eye mask. In this case, very simple maximum and minimum threshold values are established, as well as a phase window of acceptable phase jitter. This simple eye mask gives an indication of signal distortions including chromatic dispersion, noise, interference, etc, from amplifiers and other devices in the fiber link, environmental factors and from the fiber itself.

The system disclosed by U.S. Pat. No. 5,774,242, however, is not adapted for use in a DWM optical network. Furthermore, the simplicity of the eye mask does not provide information for measuring the effective BER, or distinguishable data for determining the sign of the accumulated dispersion. Thus, feedback to a dispersion compensator produces a slower corrective response.

For high data rate systems, an accurate dispersion monitor is still needed.

SUMMARY OF THE INVENTION

The present invention has found that chromatic dispersion can be effectively estimated from careful contour mapping of the eye diagram of a signal, in order to provide advanced indication of the effective BER for dynamic chromatic dispersion compensation. A dispersion compensation monitor for DWM optical systems capable of creating and analyzing the contour map of the eye diagram is further disclosed.

Accordingly, the present invention provides a method of monitoring chromatic dispersion of an optical signal of at least one optical transmission channel in an optical transmission system comprising the steps of:

tapping a portion of the optical signal;

determining metric values from an eye diagram of the tapped optical signal comprising the steps of:

receiving the portion of the optical signal at a linear optical receiver and converting the optical signal to an electrical signal;

recovering a clock signal from the electrical signal;
sampling the signal amplitude at the center of the eye diagram and comparing the amplitude to a threshold value to determine a bit value;
sampling the signal amplitude for at least four points in the eye diagram by adjusting the phase of the clock signal in accordance with a predetermined mapping algorithm in order to calculate a contoured eye map for selected metrics;
computing metric values from the contoured eye map; and,
correlating the computed metric values with a predetermined relationship between dispersion and the selected metrics, to determine the dispersion value.

In a further embodiments of the invention, a chromatic dispersion monitor for monitoring accumulated chromatic dispersion in an optical signal comprising a bit stream within a span of active transmission of an optical network comprises:
a coupler for tapping a portion of the optical signal;
a linear optical receiver for detecting the portion of the optical signal and for converting the detected portion of the optical signal into an electrical signal;
an electrical clock recovery circuit for recovering the clock from the electrical signal;
a reference detector for sampling an amplitude of a signal at the center of a signal bit and comparing the detected value to a threshold value for determining a bit value;
a variable time delay circuit for adjusting a phase of the clock relative to the bit stream controlled by a mapping algorithm to sample more than three amplitude values at different phase delays to define a contoured eye map of the optical signal;
a probe circuit for determining a bit value for each of the more than three sampled amplitude values in comparison to associated thresholds in the mapping algorithm;
a comparator circuit for comparing the bit value of the reference detector to the bit value of the probe detector for generating an estimated bit error rate;
a processor for calculating metric values from the contoured eye map and correlating the calculated metric values to a stored library of chromatic dispersion in relation to predefined metric values.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
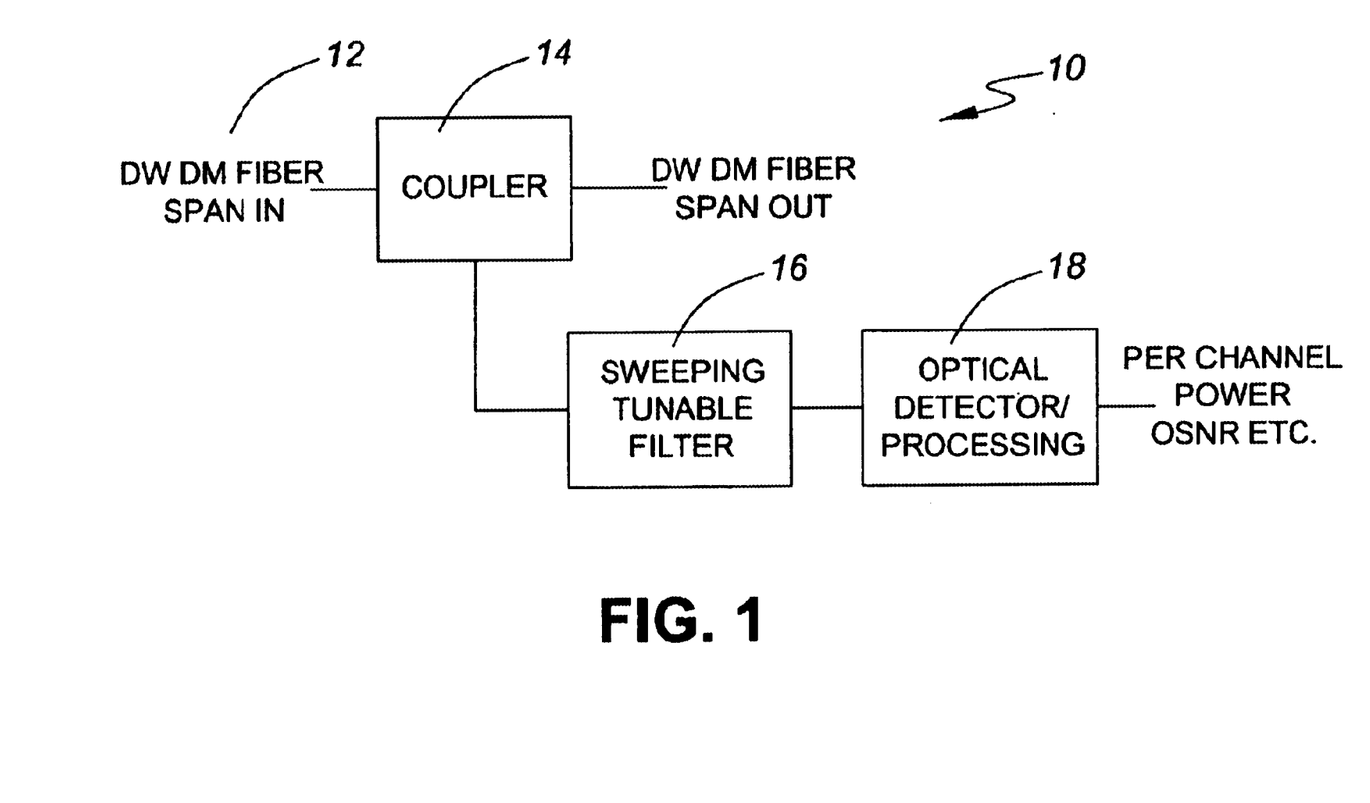
FIG. 1 is a schematic illustration of a prior art optical power monitor.

FIG. 1 schematically illustrates a prior art optical power monitor 10. A DWDM optical span 12 carries optical signals in a plurality of DWDM channels through a tap coupler 14. A small portion of the optical signals are coupled to a swept tunable filter 16. The tunable filter 16 demultiplexes one channel of wavelengths at a time, which are passed to an optical detector 18. The optical detector 18 has a low bandwidth compared to the data rate. Processing of the optical detector output provides information such as amplitude, signal to noise ratio, etc. This swept monitor approach can be applied to chromatic dispersion monitoring, with some analysis of the eye diagrams over propagation distance.

Figure 2:
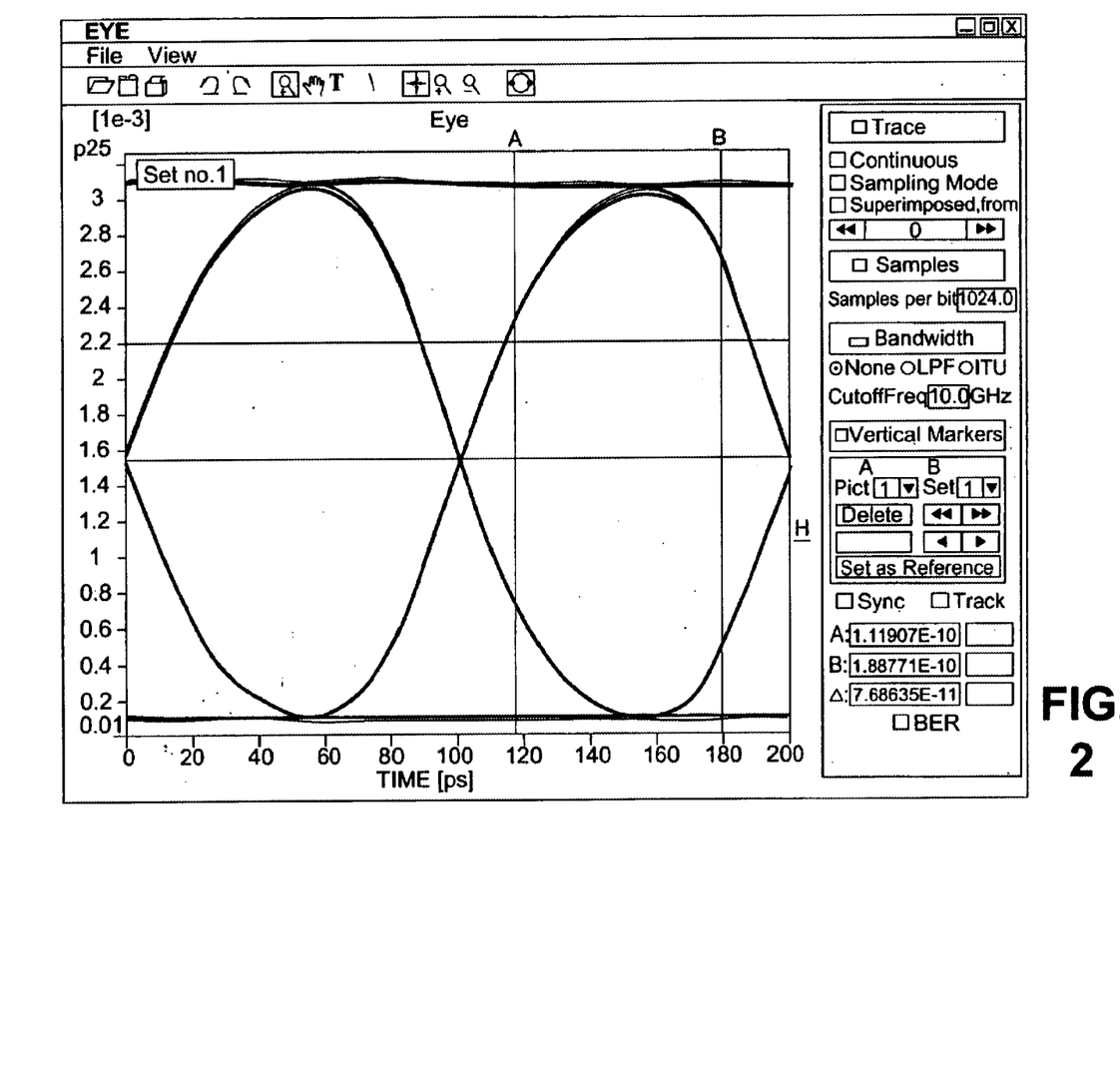
FIG. 2 is a simulated eye diagram of a 10 Gb/s SONET signal at 0 km fiber length.
Figure 3:
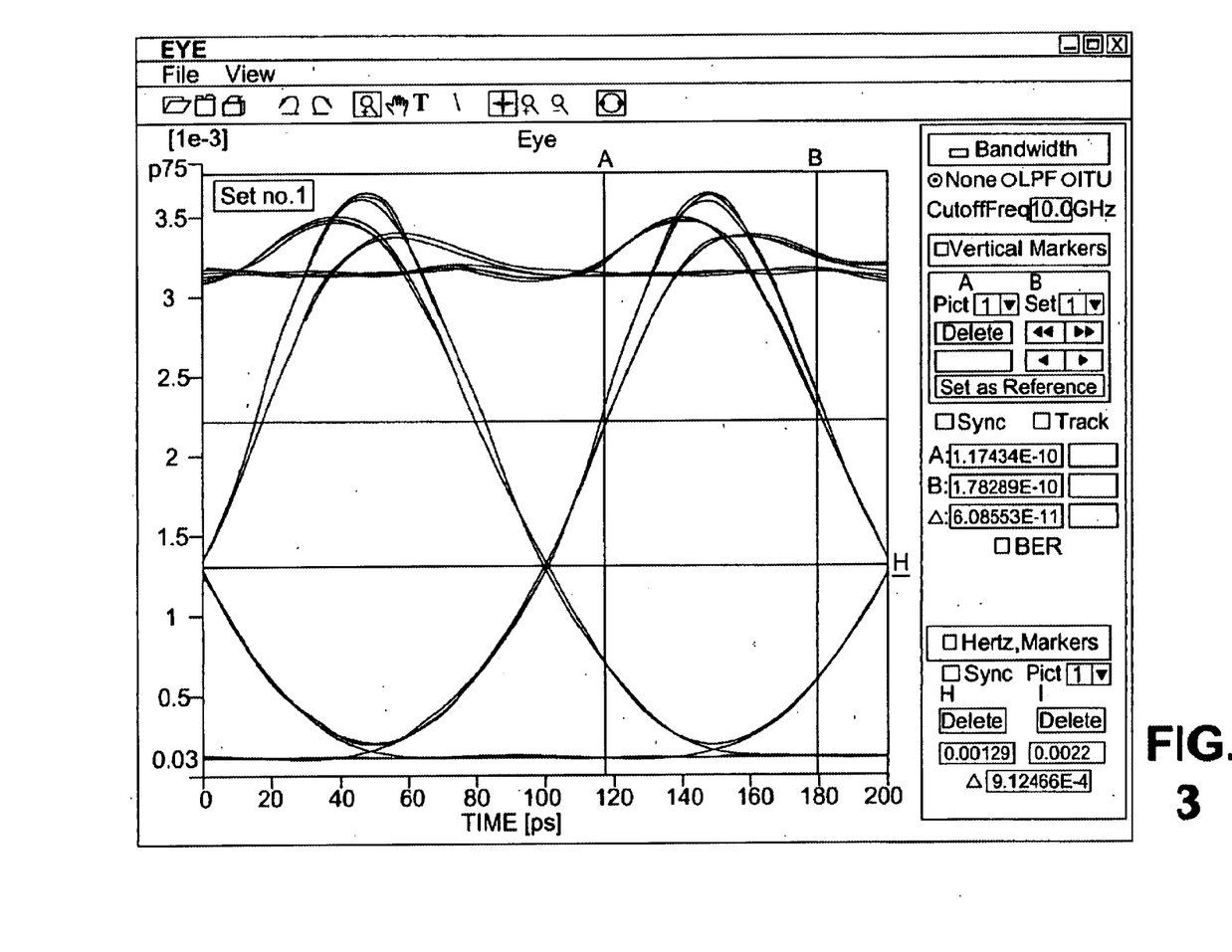
FIG. 3 is a simulated eye diagram of a 10 Gb/s SONET signal at 20 km fiber length.
Figure 4:
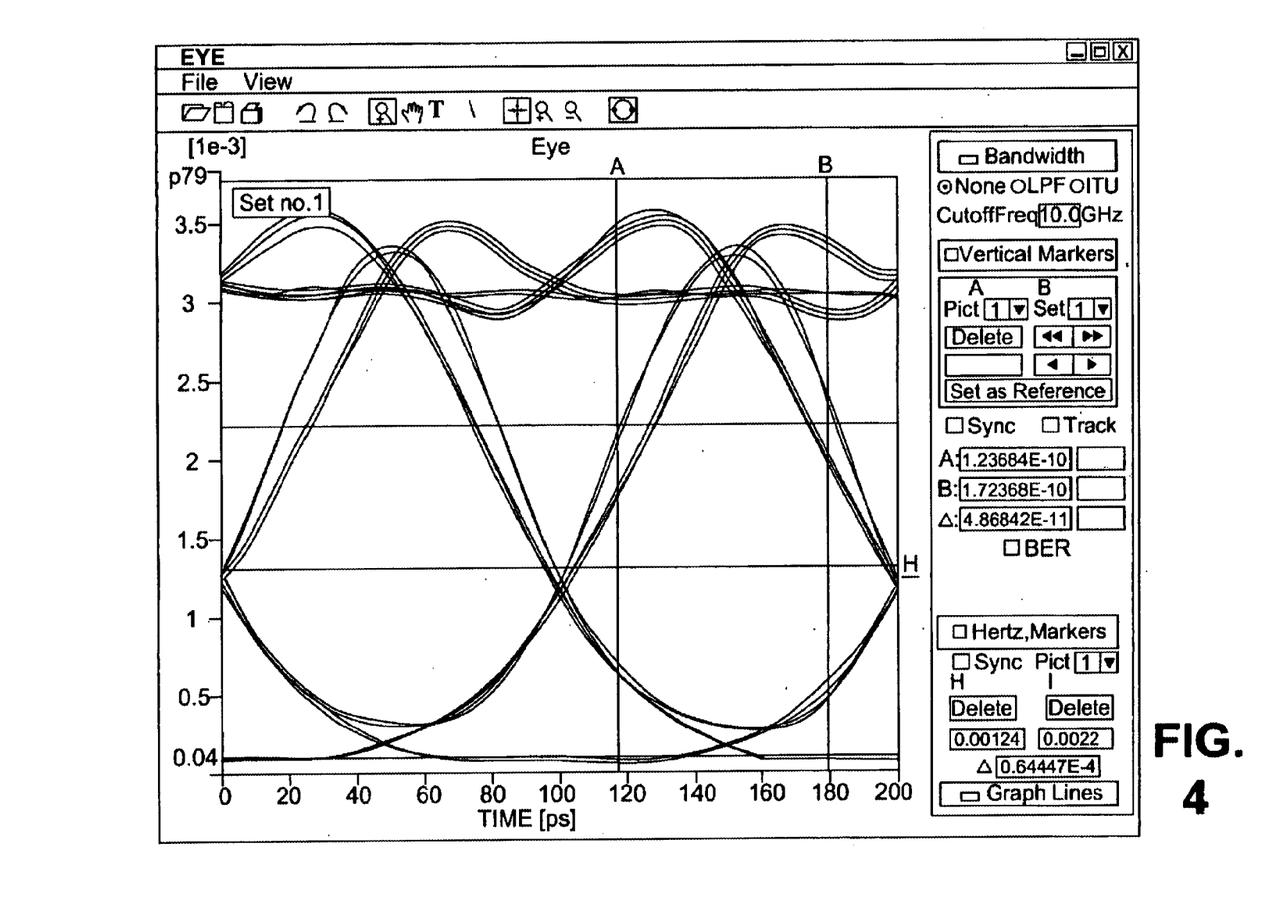
FIG. 4 is a simulated eye diagram of a 10 Gb/s SONET signal at 40 km fiber length.
Figure 5:
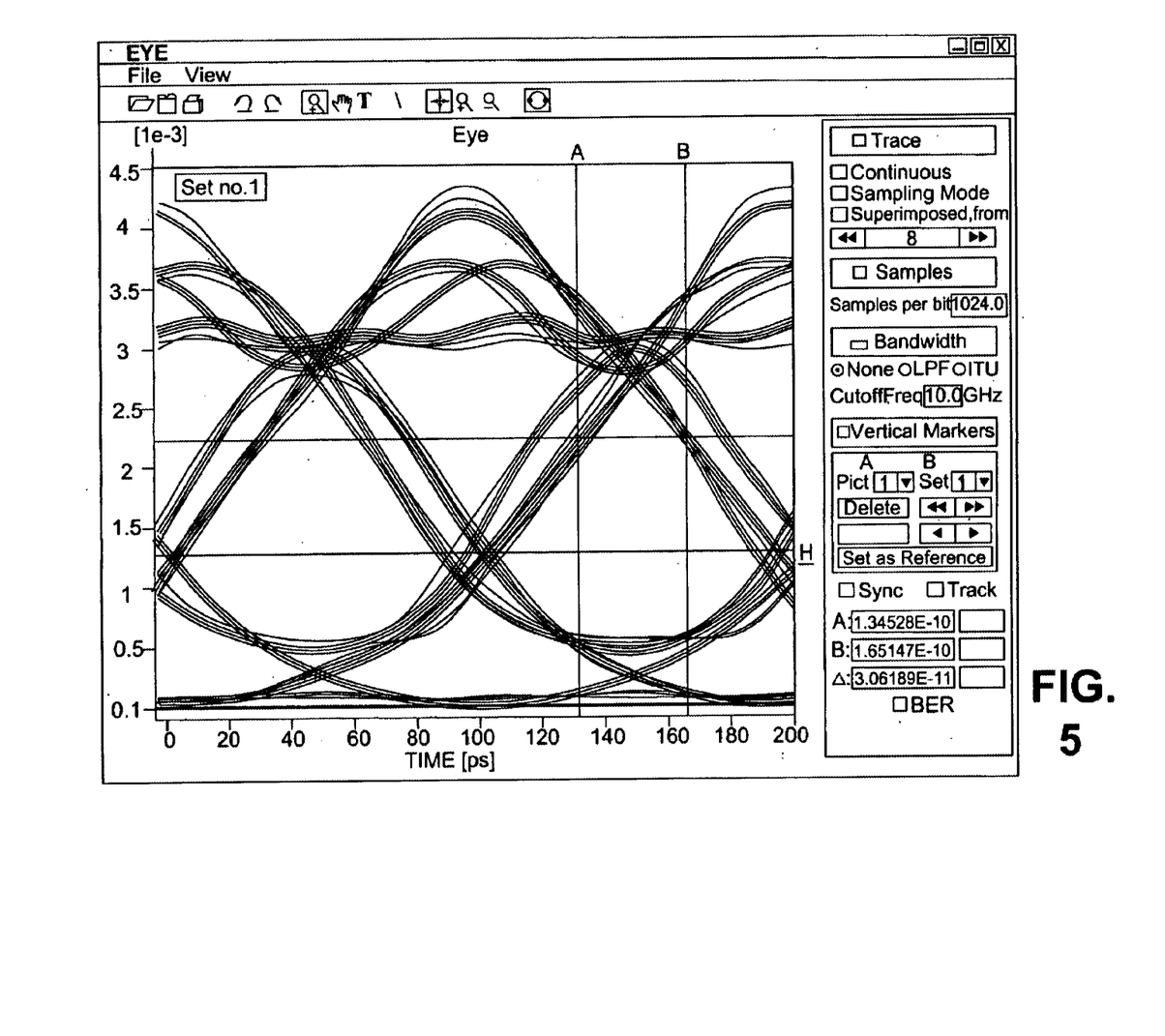
FIG. 5 is a simulated eye diagram of a 10 Gb/s SONET signal at 80 km fiber length.

The present invention makes use of the fact that the optical eye shape changes in recognizable ways as the dispersion increases. As seen in FIG. 2, the eye diagrams are nearly symmetrical at 0 km. However, the pattern of narrowing of the eye width, jitter at the eye waist and closing of the eye amplitude can be seen in the transformation of the eye diagram in FIGS. 3–5. These characteristic changes enable an eye measurement based on a BER contour approach, where a graphic figure is traced around the inner eye opening at some arbitrary but fixed error rate. This is shown, for example, as 110 in FIG. 6. A fairly high error rate is chosen, such as $1 \times 10^{-5}$, so that the eye mapping may be performed quickly.

Figure 6:
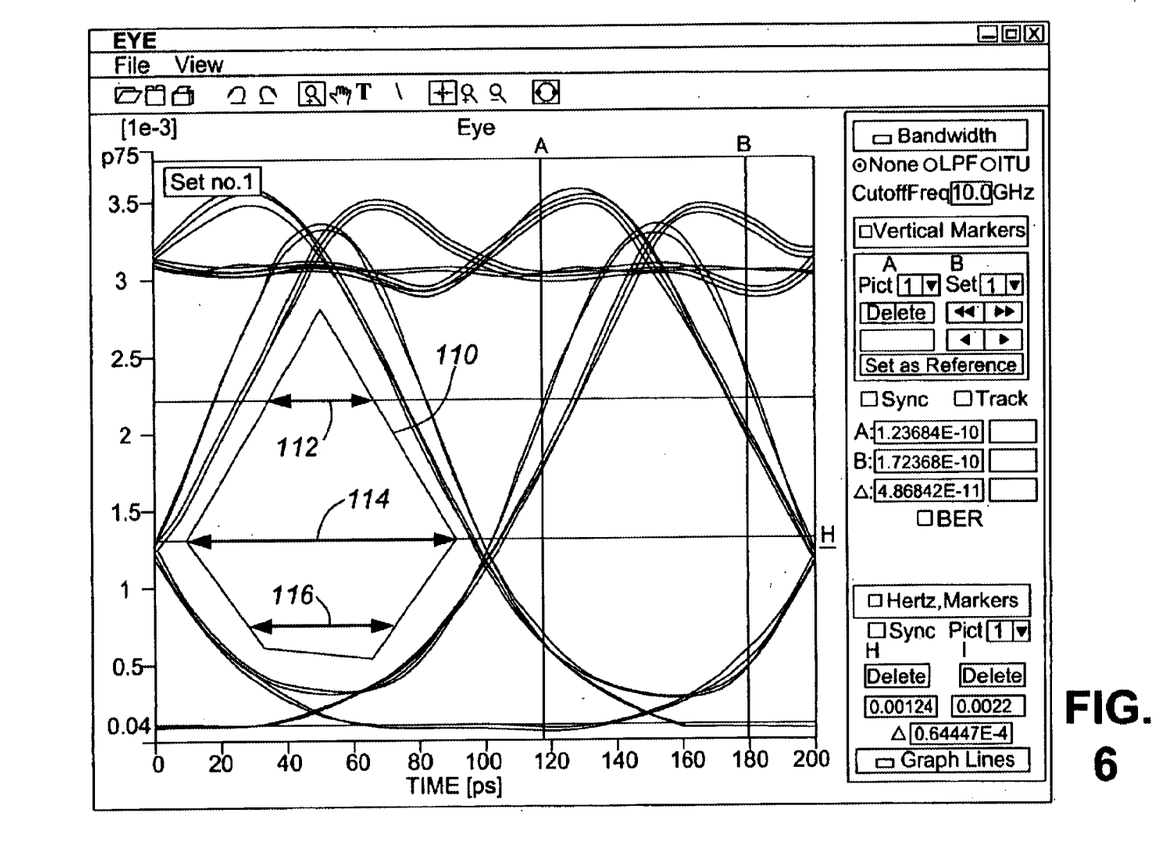
FIG. 6 illustrates the simulated eye diagram of FIG. 4 with a graphic illustration of a contour eye mapping in accordance with the present invention.
Figure 7:
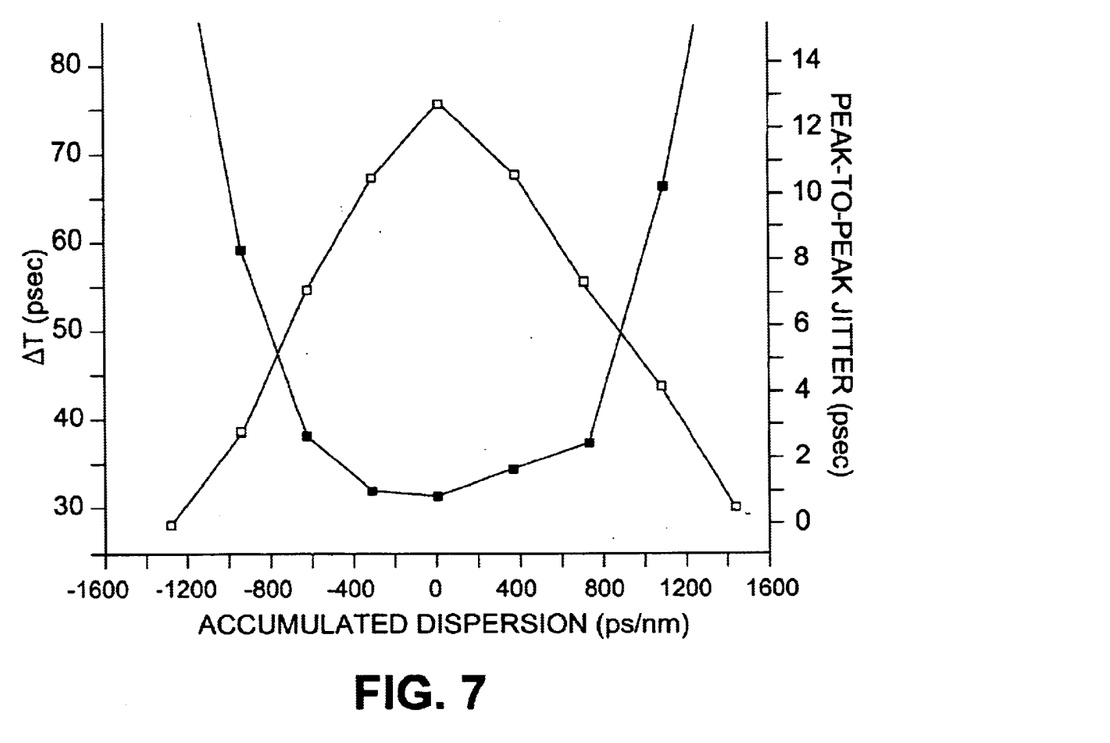
FIG. 7 shows a graph of example metrics correlated to dispersion values.

Once the eye map 110 is acquired, a set of metrics may be measured which are independent of eye amplitude, such as eye crossing percentage, slopes of the lines comprising the eye map, or widths at various points in the map such as at 75% of the opening height 112, at the eye waist 114 or at 15% of the opening height 116. A single metric is insufficient to reliably correlate the eye shape to dispersion. Therefore, multiple metrics are used. These metrics are then comparison scored in a process similar to that used in optical character recognition to correlate the metrics to actual dispersion. Two useful metrics which can be used together are eye width 112 at 75% of the opening height and jitter at the eye waist 114. FIG. 7 graphically demonstrates the correlation between accumulated dispersion and both metrics for both positive and negative dispersion. Advantageously, the operations and maintenance channel in the network can be used to transmit the metrics in a feed back or feed forward scheme to the dispersion compensator.

Figure 8:
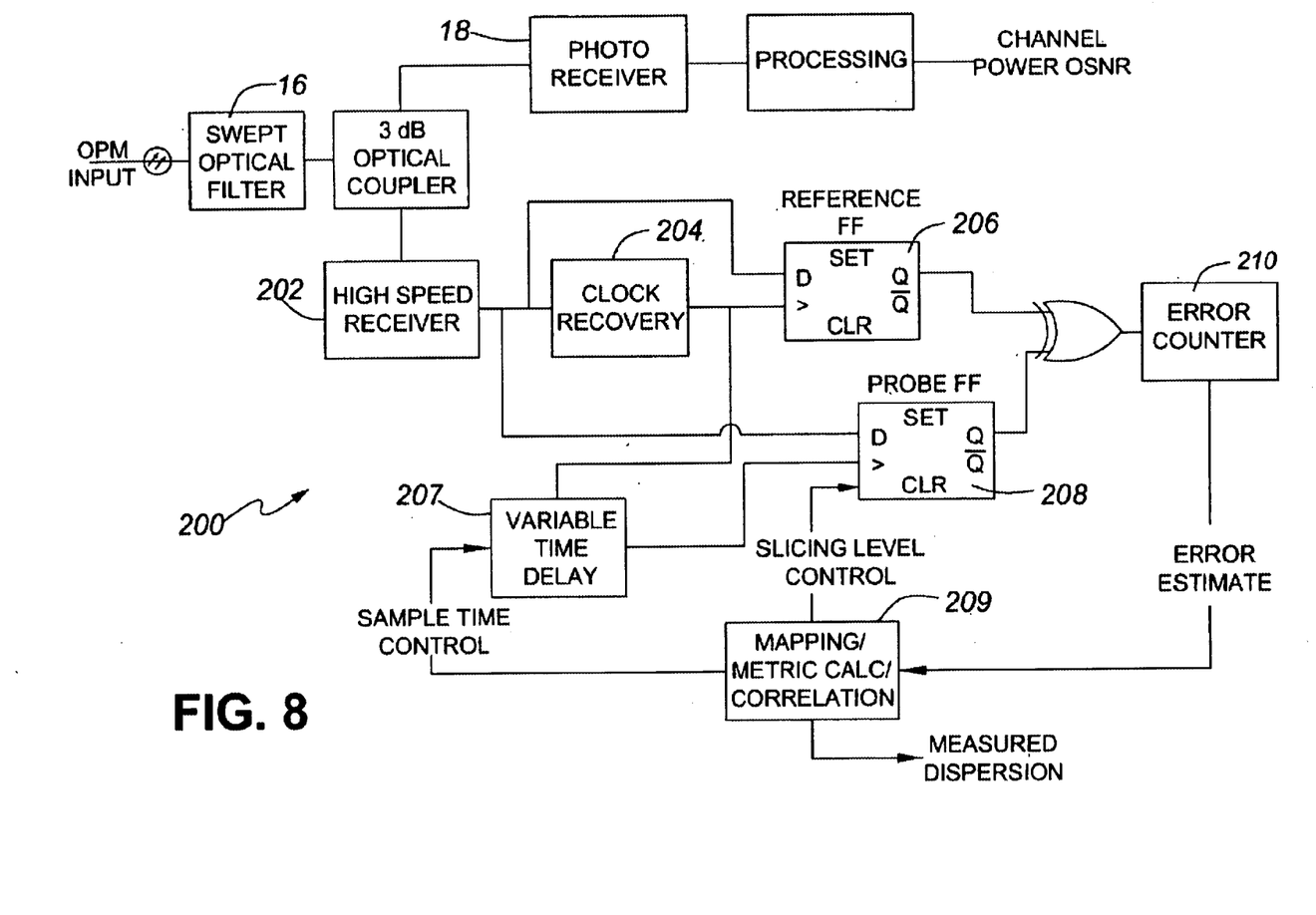
FIG. 8 is a schematic illustration of an example chromatic dispersion monitor in accordance with the present invention.

An example of a chromatic dispersion compensator in accordance with the present invention is shown in FIG. 8. Like the optical power monitor of FIG. 2, a tapped optical input of multiple channels passes through a tunable optical filter 16 where individual channels are sequentially demultiplexed. An acousto-optic tunable filter or other known tunable filter can be used. An optical power monitor may be included in the device including a photodetector 18 and processing as in FIG. 2. The dispersion monitor 200 is coupled through a 3 dB coupler. First, the filtered channel light is converted to an electrical signal by a high speed linear receiver 202. The linear receiver 202 is necessary to preserve the eye shape. A clock is recovered in clock recovery block 204 centered on the eye opening and is used to latch a decision device 206 labeled reference FF, which also has an amplitude threshold at the center of the eye. The recovered clock is adjusted in phase across the eye with a variable time delay 207 under control of the mapping block 209. The adjustable sample time is used to clock another decision device 208 labeled probe ff, which has an adjustable amplitude threshold under control of the mapping block. The outputs of the two decision devices 206, 208 are compared, and any disagreement between the two is logged in the error counter 210. An assumption is made that the center sample is the correct decision and the rate of disagreement between the two samples provides a measure of the error rate. The mapping block moves the adjustable sample point around under control of a mapping algorithm to develop the eye map. This eye map is then used to compute the metrics and correlate the equivalent dispersion.

The phase agile clock recovery 204, 207 allows a method of measuring the effective BER. A comparison of the phase adjusted amplitude values to preset threshold values provides an indication of bit value. This bit value is compared to a bit value obtained from the amplitude at the center of the eye diagram. Furthermore, the contour mapping provides distinguishable data for determining the sign of the accumulated dispersion not recognized in the prior art.

The embodiments of the invention described above are intended to be exemplary only. The scope of the invention is therefore intended to be limited solely by the scope of the appended claims.

What is claimed is:

1. A method of monitoring chromatic dispersion of an optical signal of at least one optical transmission channel in an optical transmission system comprising the steps of:

tapping a portion of the optical signal;
   determining metric values from an eye diagram of the tapped optical signal comprising the steps of:
      receiving the portion of the optical signal at a linear optical receiver and converting the optical signal to an electrical signal;
      recovering a clock signal from the electrical signal;
      sampling the signal amplitude at the center of the eye diagram and comparing the amplitude to a threshold value to determine a bit value;
      sampling the signal amplitude for at least four points in the eye diagram by adjusting the phase of the clock signal in accordance with a predetermined mapping algorithm in order to calculate a contoured eye map for selected metrics;
      computing metric values from the contoured eye map; and,
   correlating the computed metric values with a predetermined relationship between dispersion and the selected metrics, to determine the dispersion value.

2. The method of monitoring chromatic dispersion as defined in claim 1, wherein prior to sampling a portion of the optical signal, the method includes the steps of:
   establishing a mapping algorithm based on an eye diagram contour obtained for a predetermined error rate, and
   establishing a relationship between the metric values of the error map and known dispersion.

3. The method of monitoring chromatic dispersion as defined in claim 1, wherein determining the dispersion value includes determining the sign of the accumulated dispersion.

4. The method of monitoring chromatic dispersion as defined in claim 1, wherein the optical transmission system carries a plurality of channels and the step of tapping a portion of the optical signal includes demultiplexing an individual channel signal from the plurality of channel signals.

5. The method of monitoring chromatic dispersion as defined in claim 1, wherein the metrics are selected from: eye crossing percentage, slopes of the lines of the contoured eye map, eye width at 75% of eye opening height, jitter at an eye waist.

6. The method of monitoring chromatic dispersion as defined in claim 5, wherein at least two metrics are computed for correlating with predetermined dispersion values.

7. The method of monitoring chromatic dispersion as defined in claim 6, further comprising the step of transmitting the determined dispersion value and sign to a tunable dispersion compensator.

8. The method of monitoring chromatic dispersion as defined in claim 1 further including the step of:
   comparing the bit value from the signal amplitude at the center of the eye diagram to a bit value for each of the at least four points in the eye diagram to provide an estimate of bit error rate.

9. A chromatic dispersion monitor for monitoring chromatic dispersion in an optical signal comprising a bit stream within a span of active transmission of an optical network comprising:
   a coupler for tapping a portion of the optical signal;
   a linear optical receiver for detecting the portion of the optical signal and for converting the detected portion of the optical signal into an electrical signal;
   an electrical clock recovery circuit for recovering the clock from the electrical signal;
   a reference detector for sampling an amplitude of a signal at the center of a signal bit and comparing the detected value to a threshold value for determining a bit value;
   a variable time delay circuit for adjusting a phase of the clock relative to the bit stream controlled by a mapping algorithm to sample more than three amplitude values at different phase delays to define a contoured eye map of the optical signal;
   a probe circuit for determining a bit value for each of the more than three sampled amplitude values in comparison to associated thresholds in the mapping algorithm;
   a comparator circuit for comparing the bit value of the reference detector to the bit value of the probe detector for generating an estimated bit error rate;
   a processor for calculating metric values from the contoured eye map and correlating the calculated metric values to a stored library of chromatic dispersion in relation to predefined metric values.

* * * * *

UNITED STATES PATENT AND TRADEMARK OFFICE
CERTIFICATE OF CORRECTION

PATENT NO. : 6,798,500 B2
DATED : September 28, 2004
INVENTOR(S) : Wilson et al.

It is certified that error appears in the above-identified patent and that said Letters Patent is hereby corrected as shown below:

<u>Title page,</u>
Item [57], ABSTRACT,
Line 17, "vales" should read -- values --.

Signed and Sealed this

Twenty-third Day of August, 2005

JON W. DUDAS
*Director of the United States Patent and Trademark Office*